United States Patent
Yu et al.

(10) Patent No.: US 11,866,567 B2
(45) Date of Patent: Jan. 9, 2024

(54) FOAM BEAD AND SINTERED FOAM STRUCTURE

(71) Applicant: Dow Global Technologies LLC, Midland, MI (US)

(72) Inventors: Haiyang Yu, Shanghai (CN); Jozef J I Van Dun, Horgen (CH); Yunfeng Yang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 416 days.

(21) Appl. No.: 17/254,931

(22) PCT Filed: Jun. 29, 2018

(86) PCT No.: PCT/CN2018/093538
§ 371 (c)(1),
(2) Date: Dec. 22, 2020

(87) PCT Pub. No.: WO2020/000338
PCT Pub. Date: Jan. 2, 2020

(65) Prior Publication Data
US 2021/0115213 A1    Apr. 22, 2021

(51) Int. Cl.
| | |
|---|---|
| *C08J 9/232* | (2006.01) |
| *C08J 9/18* | (2006.01) |
| *C08F 287/00* | (2006.01) |
| *C08J 9/00* | (2006.01) |
| *C08L 53/00* | (2006.01) |

(52) U.S. Cl.
CPC ............ *C08J 9/232* (2013.01); *C08F 287/00* (2013.01); *C08J 9/0061* (2013.01); *C08J 9/18* (2013.01); *C08L 53/00* (2013.01); *C08J 2203/06* (2013.01); *C08J 2203/22* (2013.01); *C08J 2351/06* (2013.01); *C08J 2355/00* (2013.01); *C08J 2451/06* (2013.01); *C08L 2203/14* (2013.01)

(58) Field of Classification Search
CPC ... C08J 9/232; C08J 9/0061; C08J 9/18; C08J 2203/06; C08J 2203/22; C08J 2351/06; C08J 2355/00; C08J 2451/06; C08J 2300/108; C08J 2353/00; C08J 2400/108; C08J 2453/00; C08J 9/16; C08F 287/00; C08F 8/42; C08F 230/08; C08L 53/00; C08L 2203/14; C08L 53/005; C08L 23/0815
See application file for complete search history.

(56) References Cited

U.S. PATENT DOCUMENTS

| | | |
|---|---|---|
| 3,225,018 A | 12/1965 | Zutty |
| 4,574,133 A | 3/1986 | Umpleby |
| 4,870,111 A | 9/1989 | Donuiff et al. |
| 5,266,627 A | 11/1993 | Meverden et al. |
| 5,605,937 A | 2/1997 | Knaus |
| 5,763,498 A | 6/1998 | Knaus |
| 5,929,129 A | 7/1999 | Feichtinger |
| 7,557,147 B2 | 7/2009 | Martinez et al. |
| 7,608,668 B2 | 10/2009 | LiPiShan et al. |
| 7,666,918 B2 | 2/2010 | Prieto et al. |
| 8,609,779 B2 | 12/2013 | Harris et al. |
| 2006/0205833 A1 | 9/2006 | Martinez et al. |
| 2007/0213416 A1* | 9/2007 | Handa ............ C08J 9/127 521/79 |
| 2011/0152437 A1 | 6/2011 | Harris et al. |
| 2012/0046373 A1 | 2/2012 | Low et al. |
| 2013/0085234 A1 | 4/2013 | Harris et al. |
| 2015/0025165 A1 | 1/2015 | Chen et al. |
| 2018/0127559 A1 | 5/2018 | Takagi et al. |
| 2018/0160767 A1 | 6/2018 | Goplan |
| 2018/0160769 A1 | 6/2018 | Davis et al. |
| 2019/0263994 A1 | 8/2019 | Takagi et al. |
| 2020/0270432 A1 | 8/2020 | Kummer et al. |

FOREIGN PATENT DOCUMENTS

| | | |
|---|---|---|
| CN | 1160411 A | 7/2001 |
| CN | 101309956 A | 11/2008 |
| CN | 101360769 A | 2/2009 |
| CN | 107531935 A | 1/2018 |
| EP | 2392611 B1 | 4/2017 |
| EP | 1861454 B1 | 2/2019 |
| WO | 2006/102016 A2 | 9/2006 |
| WO | 2017/106166 A1 | 6/2017 |

OTHER PUBLICATIONS

D. Raps, et al., "Past and Present Developments in Polymer Bead Foams and Bead Foaming Technology", Polymer, vol. 56, 2015, p. 5-19, ISSN 0032-3861.
BR112020026697-3 Technical Report with English Translation Dated May 30, 2023.

* cited by examiner

*Primary Examiner* — Irina S Zemel
(74) *Attorney, Agent, or Firm* — Boyle Fredrickson, S.C.

(57) ABSTRACT

The present disclosure provides a foam bead. The foam bead is formed from a composition containing (A) a silane-functionalized ethylene/α-olefin multi-block interpolymer. The present disclosure also provides a sintered foam structure. The sintered foam structure is formed from foam beads that are formed from a composition containing (A) a silane-functionalized ethylene/α-olefin multi-block interpolymer.

13 Claims, 1 Drawing Sheet

FOAM BEAD AND SINTERED FOAM STRUCTURE

BACKGROUND

The present disclosure relates to ethylene-based polymer foams, also known as polyethylene foams.

Polyethylene foams are utilized in footwear components, such as midsole applications. Crosslinked ethylene-based polymers including ethylene vinyl acetate (EVA) copolymer and polyolefin elastomers have traditionally dominated the polyethylene foam market in footwear as they can easily be foamed with a chemical blowing agent. However, chemical blowing agents are known to produce unpleasant odors and contaminate molds.

Furthermore, crosslinked ethylene-based polymer foams are not recyclable because they are thermoset (rather than thermoplastic). In other words, crosslinked ethylene-based polymer foam beads cannot be fused together to form a uniform sintered foam structure, such as a foam midsole. Consequently, crosslinked ethylene-based polymer foams are not traditionally prepared using a foam bead process, which utilizes a physical blowing agent.

The art recognizes the need for an ethylene-based foam bead that exhibits suitable density for foam sole and foam midsole applications. The art also recognizes the need for an ethylene-based sintered foam structure that exhibits suitable density for foam sole and foam midsole applications.

SUMMARY

The instant disclosure provides a foam bead. In an embodiment, a foam bead is provided that is formed from a composition containing (A) a silane-functionalized ethylene/α-olefin multi-block interpolymer. In an embodiment, the composition further includes (B) an ethylene/α-olefin multi-block interpolymer.

The instant disclosure also provides a sintered foam structure. In an embodiment, a sintered foam structure is provided that is formed from foam beads that are formed from a composition containing (A) a silane-functionalized ethylene/α-olefin multi-block interpolymer. In an embodiment, the composition further includes (B) an ethylene/α-olefin multi-block interpolymer.

DEFINITIONS

Any reference to the Periodic Table of Elements is that as published by CRC Press, Inc., 1990-1991. Reference to a group of elements in this table is by the new notation for numbering groups. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art. The numerical ranges disclosed herein include all values from, and including, the lower and upper value. For ranges containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.). Unless stated to the contrary, implicit from the context, or customary in the art, all parts and percents are based on weight and all test methods are current as of the filing date of this disclosure.

A "blowing agent" is a substance that is capable of producing a cellular structure in the composition via a foaming process.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed.

An "ethylene-based polymer" or "ethylene polymer" is a polymer that contains a majority amount of polymerized ethylene based on the weight of the polymer, and, optionally, may comprise at least one comonomer. An "ethylene-based interpolymer" is an interpolymer that contains, in polymerized form, a majority amount of ethylene, based on the weight of the interpolymer, and at least one comonomer. Preferably, the ethylene-based interpolymer is a random interpolymer (i.e., comprises a random distribution of it monomeric constituents). A nonlimiting example of a suitable ethylene-based interpolymer is an ethylene plastomer/elastomer.

An "ethylene/α-olefin interpolymer" is an interpolymer that contains a majority amount of polymerized ethylene, based on the weight of the interpolymer, and at least one α-olefin. An "ethylene/α-olefin copolymer" is an interpolymer that contains a majority amount of polymerized ethylene, based on the weight of the copolymer, and an α-olefin, as the only two monomer types.

The term "foam bead," as used herein, refers to a foamed particle, formed by saturating a polymer particle (for example, pellet, granular particles, preferably pellet), in the presence of a blowing agent such as an inert gas (for example, $CO_2$ or $N_2$), and at a temperature within ±30° C., further within ±25° C., and further within ±20° C., of the highest melting temperature (Tm) of the polymer particle, and at a pressure from 50 Bar to 200 Bar. The saturation typically occurs for a time, such that the diameter (the as longest dimension) of the polymer particle increases by at least 50%, or at least 60%, or at least 70%, or at least 80%, or at least 90%, or at least 100%, relative to its original diameter before foaming. Typically, a saturation time is from 0.1 to 2.0 hours, or from 10 min, or 15 min, or 20 min, or 30 min to 60 min, or 90 min, or 120 min.

Here, the "highest melting temperature (Tm)" refers to the Differential Scanning calorimetry (DSC) melting peak having the highest peak temperature.

An "interpolymer" is a polymer prepared by the polymerization of at least two different types of monomers. The generic term interpolymer thus includes copolymers (employed to refer to polymers prepared from two different types of monomers), and polymers prepared from more than two different types of monomers.

"Moisture curable" and like terms indicate that the composition will cure, i.e., crosslink, upon exposure to water or water vapor. Moisture cure can be with or without the assistance of a crosslinking catalyst (e.g., a silanol condensation catalyst), promoter, etc.

An "olefin-based polymer" or "polyolefin" is a polymer that contains a majority amount of polymerized olefin monomer, for example, ethylene or propylene, (based on the weight of the polymer), and optionally, may contain at least one comonomer. Nonlimiting examples of an olefin-based polymer include an ethylene-based polymer and a propylene-based polymer.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer," as defined hereinafter. Trace amounts of impurities, for example, catalyst residues, may be incorporated into and/or within the polymer.

A "propylene-based polymer" is a polymer that contains a majority amount of polymerized propylene based on the weight of the polymer, and, optionally, may comprise at least one comonomer.

The term, "sintered foam structure," refers to a foam structure formed by compressing foam beads, as described herein, typically under a vacuum, in the presence of a heating source. In an embodiment, the heating source is steam at a steam pressure equal to, or greater than, 0.5 Bar. The filling of a mold is typically done using a vacuum, such as at a pressure of less than 1 atm.

The term "sintering" refers to a process of compacting and forming a mass of fused foam beads by heat and/or pressure into a structure, without melting the beads to the point of liquefaction.

DETAILED DESCRIPTION

The instant disclosure provides a foam bead. The foam bead is formed from a composition containing (A) a silane-functionalized ethylene/α-olefin multi-block interpolymer.

A foam bead may comprise a combination of two or more embodiments as described herein.

In an embodiment, the present foam bead is formed from a composition further containing (B) an ethylene/α-olefin multi-block interpolymer. In an embodiment, the present foam bead is formed from a composition further containing (C) one or more optional additives.

(A) Silane-Functionalized Ethylene/α-Olefin Multi-Block Interpolymer

The present foam bead is formed from a composition including (A) a silane-functionalized ethylene/α-olefin multi-block interpolymer. Preferably, the silane-functionalized ethylene/α-olefin multi-block interpolymer is a silane-functionalized ethylene/α-olefin multi-block copolymer.

The present foam bead includes a silane-functionalized ethylene/α-olefin multi-block interpolymer. A "silane-functionalized ethylene/α-olefin multi-block interpolymer" is a polymer that contains silane, α-olefin comonomer, and equal to or greater than 50 wt %, or a majority amount, of polymerized ethylene, based on the total weight of the polymer. The silane-functionalized ethylene/α-olefin multi-block interpolymer is formed by a process such as the Sioplas process, in which a hydrolyzable silane monomer (such as a vinyl silane monomer) is grafted onto the backbone of a base ethylene/α-olefin multi-block interpolymer by a process such as extrusion, prior to the interpolymer's incorporation into the present foam bead, as described, for example, in U.S. Pat. Nos. 3,225,018 and 4,574,133, each incorporated herein by reference.

i. Base Ethylene/α-Olefin Multi-Block Interpolymer

The silane-functionalized ethylene/α-olefin multi-block interpolymer may be prepared by grafting a hydrolyzable silane monomer onto the backbone of a base ethylene/α-olefin multi-block interpolymer. In an embodiment, the base ethylene/α-olefin multi-block interpolymer is a base ethylene/α-olefin multi-block copolymer.

The term "ethylene/α-olefin multi-block interpolymer" refers to an ethylene/$C_4$-$C_8$ α-olefin multi-block copolymer consisting of ethylene and one or more copolymerizable $C_4$-$C_8$ α-olefin comonomer in polymerized form (and optional additives), the polymer characterized by multiple blocks or segments of two polymerized monomer units differing in chemical or physical properties, the blocks joined (or covalently bonded) in a linear manner, that is, a polymer comprising chemically differentiated units which are joined end-to-end with respect to polymerized ethylenic functionality. In an embodiment, the base ethylene/α-olefin multi-block interpolymer is a base ethylene/α-olefin multi-block copolymer. The term "ethylene/α-olefin multi-block copolymer" refers to an ethylene/$C_4$-$C_8$ α-olefin multi-block copolymer consisting of ethylene and one copolymerizable $C_4$-$C_8$ α-olefin comonomer in polymerized form, the polymer characterized by multiple blocks or segments of two polymerized monomer units differing in chemical or physical properties, the blocks joined (or covalently bonded) in a linear manner, that is, a polymer comprising chemically differentiated units which are joined end-to-end with respect to polymerized ethylenic functionality. Base ethylene/α-olefin multi-block copolymer includes block copolymer with two blocks (di-block) and more than two blocks (multi-block). The $C_4$-$C_8$ α-olefin is selected from butene, hexene, and octene. The base ethylene/α-olefin multi-block copolymer is void of, or otherwise excludes, styrene (i.e., is styrene-free), and/or vinyl aromatic monomer, and/or conjugated diene. When referring to amounts of "ethylene" or "comonomer" in the copolymer, it is understood that this refers to polymerized units thereof. In some embodiments, the base ethylene/α-olefin multi-block copolymer can be represented by the following formula: (AB)n; where n is at least 1, preferably an integer greater than 1, such as 2, 3, 4, 5, 10, 15, 20, 30, 40, 50, 60, 70, 80, 90, 100, or higher, "A" represents a hard block or segment, and "B" represents a soft block or segment. The As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows: AAA-AA-BBB-BB. In an embodiment, the base ethylene/α-olefin multi-block copolymer does not have a third type of block, which comprises different comonomer(s). In another embodiment, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole base ethylene/α-olefin multi-block copolymer, i.e., ethylene comprises at least 50 wt % of the whole base ethylene/α-olefin multi-block copolymer. More preferably, ethylene comprises at least 60 wt %, at least 70 wt %, or at least 80 wt %, with the substantial remainder of the whole base ethylene/α-olefin multi-block copolymer comprising the $C_4$-$C_8$ α-olefin comonomer. In an embodiment, the base ethylene/α-olefin multi-block copolymer contains from 50 wt %, or 60 wt %, or 65 wt % to 80 wt %, or 85 wt %, or 90 wt % ethylene. For many base ethylene/octene multi-block copolymers, the composition comprises an ethylene content greater than 80 wt % of the whole base ethylene/octene multi-block copolymer and an octene content of from 10 wt % to 15 wt %, or from 15 wt % to 20 wt % of the whole base ethylene/octene multi-block copolymer.

The base ethylene/α-olefin multi-block copolymer includes various amounts of "hard" segments and "soft" segments. "Hard" segments are blocks of polymerized units in which ethylene is present in an amount greater than 90 wt %, or 95 wt %, or greater than 95 wt %, or greater than 98 wt %, based on the weight of the polymer, up to 100 wt %. In other words, the comonomer content (content of monomers other than ethylene) in the hard segments is less than 10 wt %, or 5 wt %, or less than 5 wt %, or less than 2 wt %, based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 wt %, or greater than 8 wt %, or greater than 10 wt %, or greater than 15 wt %, based on the weight of the polymer. In an embodiment, the comonomer content in the soft segments is greater than 20 wt %, or greater than 25 wt %, or greater than 30 wt %, or greater than 35 wt %, or greater than 40 wt %, or greater than 45 wt %, or greater than 50 wt %, or greater than 60 wt % and can be up to 100 wt %.

The soft segments can be present in an base ethylene/α-olefin multi-block copolymer from 1 wt %, or 5 wt %, or 10 wt %, or 15 wt %, or 20 wt %, or 25 wt %, or 30 wt %, or 35 wt %, or 40 wt %, or 45 wt % to 55 wt %, or 60 wt %, or 65 wt %, or 70 wt %, or 75 wt %, or 80 wt %, or 85 wt %, or 90 wt %, or 95 wt %, or 99 wt % of the total weight of the base ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, the disclosure of which is incorporated by reference herein in its entirety. In particular, hard and soft segment weight percentages and comonomer content may be determined as described in column 57 to column 63 of U.S. Pat. No. 7,608,668.

The base ethylene/α-olefin multi-block copolymer comprises two or more chemically distinct regions or segments (referred to as "blocks") joined (or covalently bonded) in a linear manner, that is, it contains chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present base ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the base ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the base ethylene/α-olefin multi-block copolymer possesses Mw/Mn from 1.0 to 3.5, or from 1.3 to 3, or from 1.4 to 2.5, or from 1.4 to 2.

In addition, the base ethylene/α-olefin multi-block copolymer possesses a PDI (or Mw/Mn) fitting a Schultz-Flory distribution rather than a Poisson distribution. The present base ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp. 9234-9238.

In an embodiment, the present base ethylene/α-olefin multi-block copolymer possesses a most probable distribution of block lengths.

Nonlimiting examples of suitable base ethylene/α-olefin multi-block copolymer are disclosed in U.S. Pat. No. 7,608,668, the entire content of which is incorporated by reference herein.

In an embodiment, the base ethylene/α-olefin multi-block copolymer has hard segments and soft segments, is styrene-free, consists of only (i) ethylene and (ii) a $C_4$-$C_8$ α-olefin (and optional additives), and is defined as having a Mw/Mn from 1.7 to 3.5, at least one melting point, Tm, in degrees Celsius, and a density, d, in grams/cubic centimeter, wherein the numerical values of Tm and d correspond to the relationship: $Tm > -2002.9 + 4538.5(d) - 2422.2(d)^2$, where the density, d, is from 0.850 g/cc, or 0.860 g/cc, or 0.870 g/cc to 0.875 g/cc, or 0.877 g/cc, or 0.880 g/cc, or 0.890 g/cc; and the melting point, Tm, is from 110° C., or 115° C., or 120° C. to 122° C., or 125° C., or 130° C., or 135° C.

In an embodiment, the base ethylene/α-olefin multi-block copolymer has a density from 0.850 g/cc, or 0.860 g/cc, or 0.865 g/cc, or 0.870 g/cc to 0.877 g/cc, or 0.880 g/cc, or 0.900 g/cc. In another embodiment, the base ethylene/α-olefin multi-block copolymer has a density from 0.850 g/cc to 0.900 g/cc, or from 0.865 g/cc to 0.900 g/cc, or from 0.865 g/cc to 0.890 g/cc.

In an embodiment, the base ethylene/α-olefin multi-block copolymer has a melting point, Tm, from 110° C., or 115° C., or 120° C. to 122° C., or 125° C., or 130° C., or 135° C. In another embodiment, the base ethylene/α-olefin multi-block copolymer has a melting point, Tm, from 110° C. to 135° C., or from 115° C. to 130° C., or from 120° C. to 130° C.

In an embodiment, the base ethylene/α-olefin multi-block copolymer has a melt index (I2) from 0.1 g/10 min, or 0.5 g/10 min to 1.0 g/10 min, or 2.0 g/10 min, or 5 g/10 min, or 10 g/10 min, or 50 g/10 min. In another embodiment, the base ethylene/α-olefin multi-block copolymer has a melt index (I2) from 0.1 g/10 min to 50 g/10 min, or from 0.5 g/10 min to 10 g/10 min, or from 0.5 g/10 min to 5 g/10 min.

In an embodiment, the base ethylene/α-olefin multi-block copolymer is a base ethylene/1-octene multi-block copolymer (consisting only of ethylene and octene comonomer) and has one, some, or all of the following properties: (i) a Mw/Mn from 1.7, or 1.8 to 2.2, or 2.5, or 3.5; and/or (ii) a density from 0.850 g/cc, or 0.860 g/cc, or 0.865 g/cc, or 0.870 g/cc to 0.877 g/cc, or 0.880 g/cc, or 0.900 g/cc; and/or (iii) a melting point, Tm, from 115° C., or 118° C., or 119° C., or 120° C. to 121° C., or 122° C., or 125° C.; and/or (iv) a melt index (I2) from 0.1 g/10 min, or 0.5 g/10 min to 1.0 g/10 min, or 2.0 g/10 min, or 5 g/10 min, or 10 g/10 min, or 50 g/10 min; and/or (v) 50-85 wt % soft segment and 50-15 wt %, or 40-15 wt % hard segment; and/or (vi) from 10 mol %, or 13 mol %, or 14 mol %, or 15 mol % to 16 mol %, or 17 mol %, or 18 mol %, or 19 mol %, or 20 mol % $C_4$-$C_{12}$ α-olefin in the soft segment; and/or (vii) from 0.5 mol %, or 1.0 mol %, or 2.0 mol %, or 3.0 mol % to 4.0 mol %, or 5 mol %, or 6 mol %, or 7 mol %, or 9 mol % octene in the hard segment; and/or (viii) an elastic recovery (Re) from 50%, or 60% to 70%, or 80%, or 90%, at 300% min deformation rate at 21° C. as measured in accordance with ASTM D1708; and/or (ix) a polydisperse distribution of blocks and a polydisperse distribution of block sizes; and/or (x) a Shore A hardness from 50, or 60, or 65, or 70, or 75 to 80, or 85, or 90. In a further embodiment, the base ethylene/1-octene multi-block copolymer has all of the above properties (i)-(x).

In an embodiment, the base ethylene/α-olefin multi-block copolymer is a base ethylene/octene multi-block copolymer. The base ethylene/octene multi-block copolymer is sold under the tradename INFUSE™, available from The Dow Chemical Company, Midland, Michigan, USA.

The base ethylene/α-olefin multi-block interpolymer, and further the base ethylene/α-olefin multi-block copolymer, may comprise two or more embodiments discussed herein.

ii. Hydrolyzable Silane Monomer

A "hydrolyzable silane monomer" is a silane-containing monomer that will graft to the base ethylene/α-olefin multi-block interpolymer to form a silane-functionalized ethylene/α-olefin multi-block interpolymer, or further a silane-grafted ethylene/α-olefin multi-block interpolymer, and is capable of crosslinking the base ethylene/α-olefin multi-block interpolymer (e.g., during moisture cure). The hydrolyzable silane monomer has the following Structure (1):

Structure (1)

in which $R^1$ is a hydrogen atom or methyl group; x is 0 or 1; n is an integer from 0, or 1 to 4, or 6, or 8, or 10, or 12; and each $R^2$ independently is a hydrolyzable organic group such as an alkoxy group having from 1 to 12 carbon atoms (e.g., methoxy, ethoxy, butoxy), an aryloxy group (e.g., phenoxy), an araloxy group (e.g., benzyloxy), an aliphatic acyloxy group having from 1 to 12 carbon atoms (e.g., formyloxy, acetyloxy, propanoyloxy), an amino or substituted amino group (e.g., alkylamino, arylamino), or a lower-alkyl group having 1 to 6 carbon atoms, with the proviso that not more than one of the three $R^2$ groups is an alkyl. The hydrolyzable silane monomer may be grafted to the base ethylene/α-olefin multi-block interpolymer, or further the base ethylene/α-olefin multi-block copolymer, by the use of a suitable quantity of organic peroxide, such as 2,5-bis(tert-butylperoxy)-2,5-dimethylhexane, to form a silane-grafted ethylene/α-olefin multi-block interpolymer. Nonlimiting examples of suitable hydrolyzable silane monomer include silane monomers that comprise an ethylenically unsaturated hydrocarbyl group, such as a vinyl, allyl, isopropenyl, butenyl, cyclohexenyl or gamma (meth)acryloxy allyl group, and a hydrolyzable group, such as, for example, a hydrocarbyloxy, hydrocarbonyloxy, or hydrocarbylamino group. Nonlimiting examples of suitable hydrolyzable groups include methoxy, ethoxy, formyloxy, acetoxy, propionyloxy, and alkyl or arylamino groups. In an embodiment, the hydrolyzable silane monomer is an unsaturated alkoxy silane, which can be grafted onto the base ethylene/α-olefin multi-block interpolymer, or further the base ethylene/α-olefin multi-block copolymer. These hydrolyzable silane monomers and their method of preparation are more fully described in U.S. Pat. No. 5,266,627, incorporated herein by reference. Nonlimiting examples of suitable hydrolyzable silane monomer include vinyltrimethoxysilane (VTMS), vinyltriethoxysilane (VTES), vinyltriacetoxysilane, and gamma-(meth)acryloxy propyl trimethoxy silane. In an embodiment, the hydrolyzable silane monomer is VTMS and the silane-functionalized ethylene/α-olefin multi-block interpolymer is a silane-grafted ethylene/α-olefin multi-block interpolymer, or further a silane-grafted ethylene/α-olefin multi-block copolymer.

In an embodiment, the silane-functionalized ethylene/α-olefin multi-block interpolymer, or further the silane-grafted ethylene/α-olefin multi-block interpolymer, contains from 0.5 wt %, or 1.0 wt %, or 1.2 wt % to 1.5 wt %, or 1.6 wt %, or 2.0 wt %, or 3.0 wt %, or 4.0 wt %, or 5.0 wt % silane, based on the total weight of the silane-functionalized ethylene/α-olefin multi-block interpolymer, or further the silane-grafted ethylene/α-olefin multi-block interpolymer. In another embodiment, the silane-functionalized ethylene/α-olefin multi-block interpolymer, or further the silane-grafted ethylene/α-olefin multi-block interpolymer, contains from 0.5 wt % to 5.0 wt %, or from 0.5 wt % to 3.0 wt %, or from 0.5 wt % to 1.6 wt % silane, based on the total weight of the silane-functionalized ethylene/α-olefin multi-block interpolymer, or further the silane-grafted ethylene/α-olefin multi-block interpolymer. In an embodiment, the silane-functionalized ethylene/α-olefin multi-block interpolymer is a silane-functionalized ethylene/α-olefin multi-block copolymer. In another embodiment, the silane-grafted ethylene/α-olefin multi-block interpolymer is a silane-grafted ethylene/α-olefin multi-block copolymer. Nonlimiting examples of suitable α-olefins include, for example, $C_3$, $C_4$, $C_5$, $C_6$ and $C_8$ α-olefins.

In an embodiment, the silane-functionalized ethylene/α-olefin multi-block interpolymer, or further the silane-grafted ethylene/α-olefin multi-block interpolymer, has a density from 0.865 g/cc, or 0.870 g/cc, or 0.875 g/cc to 0.880 g/cc, or 0.885 g/cc, or 0.900 g/cc. In another embodiment, the silane-functionalized ethylene/α-olefin multi-block interpolymer, or further the silane-grafted ethylene/α-olefin multi-block interpolymer, has a density from 0.865 g/cc to 0.900 g/cc, or from 0.870 g/cc to 0.890 g/cc, or from 0.875 g/cc to 0.890 g/cc. In an embodiment, the silane-functionalized ethylene/α-olefin multi-block interpolymer is a silane-functionalized ethylene/α-olefin multi-block copolymer. In another embodiment, the silane-grafted ethylene/α-olefin multi-block interpolymer is a silane-grafted ethylene/

α-olefin multi-block copolymer. Nonlimiting examples of suitable α-olefins include, for example, $C_3$, $C_4$, $C_5$, $C_6$ and $C_8$ α-olefins.

In an embodiment, the silane-functionalized ethylene/α-olefin multi-block interpolymer, or further the silane-grafted ethylene/α-olefin multi-block interpolymer, has a single melting peak. In a further embodiment, the silane-functionalized ethylene/α-olefin multi-block interpolymer, or further the silane-grafted ethylene/α-olefin multi-block interpolymer, has a melting point, Tm, from 110° C., or 115° C., or 119° C., or 120° C. to 122° C., or 125° C., or 130° C., or 135° C. In another embodiment, the silane-functionalized ethylene/α-olefin multi-block interpolymer, or further the silane-grafted ethylene/α-olefin multi-block interpolymer, has a melting point, Tm, from 110° C. to 135° C., or from 115° C. to 130° C., or from 115° C. to 125° C. In an embodiment, the silane-functionalized ethylene/α-olefin multi-block interpolymer is a silane-functionalized ethylene/α-olefin multi-block copolymer. In another embodiment, the silane-grafted ethylene/α-olefin multi-block interpolymer is a silane-grafted ethylene/α-olefin multi-block copolymer. Nonlimiting examples of suitable α-olefins include, for example, $C_3$, $C_4$, $C_5$, $C_6$ and $C_8$ α-olefins.

In an embodiment, the silane-functionalized ethylene/α-olefin multi-block interpolymer, or further the silane-grafted ethylene/α-olefin multi-block interpolymer, has a melt index (I2) from 0.05 g/10 min, or 0.10 g/10 min, or 0.50 g/10 min to 1.0 g/10 min, or 2.0 g/10 min, or 2.5 g/10 min, or 3.0 g/10 min, or 4.0 g/10 min, or 5.0 g/10 min, measured at 190° C. with 2.16 kg load. In another embodiment, the silane-functionalized ethylene/α-olefin multi-block interpolymer, or further the silane-grafted ethylene/α-olefin multi-block interpolymer, has a melt index (I2) from 0.05 g/10 min to 5.0 g/10 min, or from 0.05 g/10 min to 2.0 g/10 min, or from 0.10 g/10 min to 1.0 g/10 min, measured at 190° C. with 2.16 kg load. In an embodiment, the silane-functionalized ethylene/α-olefin multi-block interpolymer is a silane-functionalized ethylene/α-olefin multi-block copolymer. In another embodiment, the silane-grafted ethylene/α-olefin multi-block interpolymer is a silane-grafted ethylene/α-olefin multi-block copolymer. Nonlimiting examples of suitable α-olefins include, for example, $C_3$, $C_4$, $C_5$, $C_6$ and $C_8$ α-olefins.

In an embodiment, the silane-functionalized ethylene/α-olefin multi-block interpolymer, or further the silane-grafted ethylene/α-olefin multi-block interpolymer, has a heat of fusion, $H_f$, from 30 J/g, or 40 J/g, or 45 J/g, or 50 J/g to 52 J/g, or 55 J/g, or 60 J/g, or 65 J/g, or 70 J/g, or 75 J/g, or 80 J/g. In another embodiment, the silane-functionalized ethylene/α-olefin multi-block interpolymer, or further the silane-grafted ethylene/α-olefin multi-block interpolymer, has a heat of fusion, $H_f$, from 30 J/g to 80 J/g, or from 40 J/g to 75 J/g, or from 45 J/g to 70 J/g. In an embodiment, the silane-functionalized ethylene/α-olefin multi-block interpolymer is a silane-functionalized ethylene/α-olefin multi-block copolymer. In another embodiment, the silane-grafted ethylene/α-olefin multi-block interpolymer is a silane-grafted ethylene/α-olefin multi-block copolymer. Nonlimiting examples of suitable α-olefins include, for example, $C_3$, $C_4$, $C_5$, $C_6$ and $C_8$ α-olefins.

In an embodiment, the silane-functionalized ethylene/α-olefin multi-block interpolymer, or further the silane-grafted ethylene/α-olefin multi-block interpolymer, contains from 0.5 wt %, or 1.0 wt %, or 1.2 wt % to 1.5 wt %, or 1.6 wt %, or 2.0 wt %, or 3.0 wt %, or 4.0 wt % to 5.0 wt % silane, based on the total weight of the silane-functionalized ethylene/α-olefin multi-block interpolymer, or further the silane-grafted ethylene/α-olefin multi-block interpolymer. In an embodiment, the silane-functionalized ethylene/α-olefin multi-block interpolymer, or further the silane-grafted ethylene/α-olefin multi-block interpolymer, has one, some, or all of the following properties: (i) a density from 0.865 g/cc, or 0.870 g/cc, or 0.875 g/cc to 0.880 g/cc, or 0.885 g/cc, or 0.900 g/cc; and/or (ii) a single melting peak; and/or (iii) a melting point, Tm, from 110° C., or 115° C., or 119° C., or 120° C. to 122° C., or 125° C., or 130° C., or 135° C.; and/or (iv) a melt index (2) from 0.05 g/10 min, or 0.1 g/10 min, or 0.5 g/10 min to 1.0 g/10 min, or 2.0 g/10 min, or 2.5 g/10 min, or 3.0 g/10 min, or 4.0 g/10 min, or 5.0 g/10 min; and/or (v) a heat of fusion, $H_f$, from 30 J/g, or 40 J/g, or 45 J/g, or 50 J/g to 52 J/g, or 55 J/g, or 60 J/g, or 65 J/g, or 70 J/g, or 75 J/g, or 80 J/g. In a further embodiment, the silane-functionalized ethylene/α-olefin multi-block interpolymer, or further the silane-grafted ethylene/α-olefin multi-block interpolymer, has all of the above properties (i)-(v). In an embodiment, the silane-functionalized ethylene/α-olefin multi-block interpolymer is a silane-functionalized ethylene/α-olefin multi-block copolymer. In another embodiment, the silane-grafted ethylene/α-olefin multi-block interpolymer is a silane-grafted ethylene/α-olefin multi-block copolymer. Nonlimiting examples of suitable α-olefins include, for example, $C_3$, $C_4$, $C_5$, $C_6$ and $C_8$ α-olefins.

In an embodiment, the foam bead is formed from a composition containing greater than, or equal to 95 wt % of the silane-functionalized ethylene/α-olefin multi-block interpolymer, or further the silane-grafted ethylene/α-olefin multi-block interpolymer, based on the total weight of the composition, or further based on the total weight of the foam bead. In another embodiment, the foam bead is formed from a composition containing 100 wt % of the silane-functionalized ethylene/α-olefin multi-block interpolymer, or further the silane-grafted ethylene/α-olefin multi-block interpolymer, based on the total weight of the composition, or further based on the total weight of the foam bead. In an embodiment, the foam bead is formed from a composition containing from 95 wt %, or 98 wt % to 99 wt %, or 100 wt % of the silane-functionalized ethylene/α-olefin multi-block interpolymer, or further the silane-grafted ethylene/α-olefin multi-block interpolymer, based on the total weight of the composition, or further based on the total weight of the foam bead. In an embodiment, the silane-functionalized ethylene/α-olefin multi-block interpolymer is a silane-functionalized ethylene/α-olefin multi-block copolymer. In another embodiment, the silane-grafted ethylene/α-olefin multi-block interpolymer is a silane-grafted ethylene/α-olefin multi-block copolymer. Nonlimiting examples of suitable α-olefins include, for example, $C_3$, $C_4$, $C_5$, $C_6$ and $C_8$ α-olefins.

In an embodiment, the foam bead is formed from a composition containing from 20 wt %, or 25 wt %, or 30 wt % to 40 wt %, or 50 wt %, or 60 wt %, or 65 wt %, or 70 wt %, or 75 wt %, or 80 wt %, or 85 wt %, or 90 wt %, or 95 wt %, or 98 wt %, or 99 wt %, or 100 wt % of the silane-functionalized ethylene/α-olefin multi-block interpolymer, or further the silane-grafted ethylene/α-olefin multi-block interpolymer, based on the total weight of the composition, or further based on the total weight of the foam bead. In another embodiment, the foam bead is formed from a composition containing from 20 wt % to 100 wt %, or from 20 wt % to 90 wt %, or from 20 wt % to 50 wt %, or from 25 wt % to 40 wt %, or from 25 wt % to 35 wt % of the silane-functionalized ethylene/α-olefin multi-block interpolymer, or further the silane-grafted ethylene/α-olefin multi-block interpolymer, based on the total weight of the composition, or further based on the total weight of the foam bead. In an embodiment, the silane-functionalized ethylene/α-olefin multi-block interpolymer is a silane-functionalized ethylene/α-olefin multi-block copolymer. In another embodiment, the silane-grafted ethylene/α-olefin multi-block interpolymer is a silane-grafted ethylene/α-olefin multi-block copolymer. Nonlimiting examples of suitable α-olefins include, for example, $C_3$, $C_4$, $C_5$, $C_6$ and $C_8$ α-olefins.

The silane-functionalized ethylene/α-olefin multi-block interpolymer may comprise two or more embodiments disclosed herein. The silane-functionalized ethylene/α-olefin multi-block copolymer may comprise two or more embodiments disclosed herein.

The silane-grafted ethylene/α-olefin multi-block interpolymer may comprise two or more embodiments disclosed herein. The silane-grafted ethylene/α-olefin multi-block copolymer may comprise two or more embodiments disclosed herein.

B. Ethylene/α-Olefin Multi-Block Interpolymer

In an embodiment, the foam bead is formed from a composition containing (B) an ethylene/α-olefin multi-block interpolymer.

The (B) ethylene/α-olefin multi-block interpolymer is different than the (A) silane-functionalized ethylene/α-olefin multi-block interpolymer because the (B) ethylene/α-olefin multi-block interpolymer is not silane-functionalized.

The (B) ethylene/α-olefin multi-block interpolymer may be any base ethylene/α-olefin multi-block interpolymer disclosed herein.

The (B) ethylene/α-olefin multi-block interpolymer and the base ethylene/α-olefin multi-block interpolymer that is used to form the (A) silane-functionalized ethylene/α-olefin multi-block interpolymer may be the same or different. In an embodiment, the (B) ethylene/α-olefin multi-block interpolymer and the base ethylene/α-olefin multi-block interpolymer that is used to form the (A) silane-functionalized ethylene/α-olefin multi-block interpolymer are physically, compositionally, and structurally the same. In another embodiment, the (B) ethylene/α-olefin multi-block interpolymer and the base ethylene/α-olefin multi-block interpolymer that is used to form the (A) silane-functionalized ethylene/α-olefin multi-block interpolymer are physically, compositionally, and/or structurally different.

In an embodiment the ethylene/α-olefin multi-block interpolymer is an ethylene/α-olefin multi-block copolymer. In an embodiment, the ethylene/α-olefin multi-block copolymer has hard segments and soft segments, is styrene-free, consists of only (i) ethylene and (ii) a $C_4$-$C_8$ α-olefin (and optional additives), and is defined as having a Mw/Mn from 1.7 to 3.5, at least one melting point, Tm, in degrees Celsius, and a density, d, in grams/cubic centimeter, wherein the numerical values of Tm and d correspond to the relationship: Tm>−2002.9+4538.5(d)−2422.2(d)$^2$, where the density, d, is from 0.850 g/cc, or 0.860 g/cc, or 0.870 g/cc to 0.875 g/cc, or 0.877 g/cc, or 0.880 g/cc, or 0.890 g/cc; and the melting point, Tm, is from 110° C., or 115° C., or 120° C. to 122° C., or 125° C., or 130° C., or 135° C.

In an embodiment, the ethylene/α-olefin multi-block interpolymer has a density from 0.850 g/cc, or 0.860 g/cc, or 0.865 g/cc, or 0.870 g/cc to 0.877 g/cc, or 0.880 g/cc, or 0.900 g/cc. In another embodiment, the ethylene/α-olefin multi-block interpolymer has a density from 0.850 g/cc to 0.900 g/cc, or from 0.865 g/cc to 0.900 g/cc, or from 0.865 g/cc to 0.890 g/cc. In an embodiment the ethylene/α-olefin multi-block interpolymer is an ethylene/α-olefin multi-block copolymer. Nonlimiting examples of suitable α-olefins include, for example, $C_3$, $C_4$, $C_5$, $C_6$ and $C_8$ α-olefins.

In an embodiment, the ethylene/α-olefin multi-block interpolymer has a melting point, Tm, from 110° C., or 115° C., or 120° C. to 122° C., or 125° C., or 130° C., or 135° C. In another embodiment, the ethylene/α-olefin multi-block interpolymer has a melting point, Tm, from 110° C. to 135° C., or from 115° C. to 130° C., or from 120° C. to 130° C. In an embodiment the ethylene/α-olefin multi-block interpolymer is an ethylene/α-olefin multi-block copolymer. Nonlimiting examples of suitable α-olefins include, for example, $C_3$, $C_4$, $C_5$, $C_6$ and $C_8$ α-olefins.

In an embodiment, the ethylene/α-olefin multi-block interpolymer has a melt index (I2) from 0.1 g/10 min, or 0.5 g/10 min to 1.0 g/10 min, or 2.0 g/10 min, or 5 g/10 min, or 10 g/10 min, or 50 g/10 min. In another embodiment, the ethylene/α-olefin multi-block interpolymer has a melt index (I2) from 0.1 g/10 min to 50 g/10 min, or from 0.5 g/10 min to 10 g/10 min, or from 0.5 g/10 min to 5 g/10 min. In an embodiment the ethylene/α-olefin multi-block interpolymer is an ethylene/α-olefin multi-block copolymer. Nonlimiting examples of suitable α-olefins include, for example, $C_3$, $C_4$, $C_5$, $C_6$ and $C_8$ α-olefins.

In an embodiment the ethylene/α-olefin multi-block interpolymer is an ethylene/α-olefin multi-block copolymer. In an embodiment, the ethylene/α-olefin multi-block copolymer is an ethylene/1-octene multi-block copolymer (consisting only of ethylene and octene comonomer) and has one, some, or all of the following properties: (i) a Mw/Mn from 1.7, or 1.8 to 2.2, or 2.5, or 3.5; and/or (ii) a density from 0.850 g/cc, or 0.860 g/cc, or 0.865 g/cc, or 0.870 g/cc to 0.877 g/cc, or 0.880 g/cc, or 0.900 g/cc; and/or (iii) a melting point, Tm, from 115° C., or 118° C., or 119° C., or 120° C. to 121° C., or 122° C., or 125° C.; and/or (iv) a melt index (I2) from 0.1 g/10 min, or 0.5 g/10 min to 1.0 g/10 min, or 2.0 g/10 min, or 5 g/10 min, or 10 g/10 min, or 50 g/10 min; and/or (v) 50-85 wt % soft segment and 50-15 wt %, or 40-15 wt % hard segment; and/or (vi) from 10 mol %, or 13 mol %, or 14 mol %, or 15 mol % to 16 mol %, or 17 mol %, or 18 mol %, or 19 mol %, or 20 mol % $C_4$-$C_{12}$ α-olefin in the soft segment; and/or (vii) from 0.5 mol %, or 1.0 mol %, or 2.0 mol %, or 3.0 mol % to 4.0 mol %, or 5.0 mol %, or 6.0 mol %, or 7.0 mol %, or 9.0 mol % octene in the hard segment; and/or (viii) an elastic recovery (Re) from 50%, or 60% to 70%, or 80%, or 90%, at 300% min$^{-1}$ deformation rate at 21° C. as measured in accordance with ASTM D1708; and/or (ix) a polydisperse distribution of blocks and a polydisperse distribution of block sizes.

In an embodiment, the ethylene/α-olefin multi-block interpolymer, or further the ethylene/α-olefin multi-block copolymer, has one, some, or all of the following properties: (i) a density from 0.865 g/cc, or 0.870 g/cc, or 0.875 g/cc, or 0.880 g/cc to 0.885 g/cc, or 0.900 g/cc; and/or (ii) a single melting peak; and/or (iii) a melting point, Tm, from 110° C., or 115° C., or 120° C., or 122° C. to 125° C., or 130° C., or 135° C.; and/or (iv) a melt index (I2) from 0.5 g/10 min, or 1.0 g/10 min, or 2.0 g/10 min to 2.5 g/10 min, or 3.0 g/10 min, or 4.0 g/10 min, or 5.0 g/10 min; and/or (v) a heat of fusion, $H_f$, from 40 J/g, or 45 J/g, or 50 J/g, or 52 J/g to 55 J/g, or 60 J/g, or 65 J/g, or 70 J/g, or 75 J/g, or 80 J/g; and/or (vi) a Shore A hardness from 50, or 60, or 65, or 70, or 75 to 80, or 85, or 90. In a further embodiment, the ethylene/α-olefin multi-block interpolymer, or further the ethylene/α-olefin multi-block copolymer, has all of the above properties (i)-(vi). In an embodiment the ethylene/α-olefin multi-block interpolymer is an ethylene/α-olefin multi-block copolymer. Nonlimiting examples of suitable α-olefins include, for example, $C_3$, $C_4$, $C_5$, $C_6$ and $C_8$ α-olefins.

In an embodiment the ethylene/α-olefin multi-block interpolymer is an ethylene/α-olefin multi-block copolymer. In an embodiment, the ethylene/α-olefin multi-block copolymer is an ethylene/octene multi-block copolymer. The ethylene/octene multi-block copolymer is sold under the tradename INFUSE™, available from The Dow Chemical Company, Midland, Michigan, USA.

In an embodiment, the foam bead is formed from a composition containing from 10 wt %, or 15 wt %, or 20 wt %, or 25 wt %, or 30 wt % to 35 wt %, or 40 wt %, or 45 wt %, or 50 wt %, or 55 wt %, or 60 wt %, or 65 wt %, or 70 wt %, or 75 wt %, or 80 wt % of the ethylene/α-olefin multi-block interpolymer, or further the ethylene/α-olefin multi-block copolymer, based on the total weight of the composition, or further based on the total weight of the foam bead. In another embodiment, the foam bead is formed from a composition containing from 10 wt % to 80 wt %, or from 50 wt % to 80 wt %, or from 60 wt % to 75 wt %, or from 65 wt % to 75 wt % of the ethylene/α-olefin multi-block interpolymer, or further the ethylene/α-olefin multi-block copolymer, based on the total weight of the composition, or further based on the total weight of the foam bead. In an embodiment the ethylene/α-olefin multi-block interpolymer is an ethylene/α-olefin multi-block copolymer. Nonlimiting examples of suitable α-olefins include, for example, $C_3$, $C_4$, $C_5$, $C_6$ and $C_8$ α-olefins.

The ethylene/α-olefin multi-block interpolymer, and further the ethylene/α-olefin multi-block copolymer, may comprise two or more embodiments discussed herein.

C. Additives

The present composition may include one or more optional additives. Nonlimiting examples of suitable additives include nucleators (e.g., talc and polytetrafluoroethylene (PTFE)), processing aids, lubricants, stabilizers (antioxidants), foaming aids, surfactants, flow aids, viscosity control agents, coloring agents, copper inhibitors, inorganic fillers (e.g., calcium carbonate ($CaCO_3$), titanium dioxide ($TiO_2$)), ethylene-based polymers (e.g., ethylene-based plastomers or elastomers such as those sold under the tradename ENGAGE™ by The Dow Chemical Company), propylene-based polymers (e.g. propylene-based plastomers or elastomers such as those sold under the tradename VERSIFY™ by The Dow Chemical Company), and combinations thereof.

In an embodiment, the foam bead is formed from a composition containing from 0 wt %, or 0.01 wt % to 0.3 wt %, or 0.5 wt %, or 1 wt %, or 2 wt %, or 3 wt %, or 5 wt % optional additive, based on the total weight of the composition, or further based on the total weight of the foam bead. In another embodiment, the foam bead is formed from a composition containing from 0 wt % to 5 wt %, or from 0 wt % to 1 wt %, or from 0.01 wt % to 5 wt % optional additive, based on the total weight of the composition, or further based on the total weight of the foam bead.

The optional additive may comprise two or more embodiments discussed herein.

D. Foam Bead

The present foam bead is formed from a composition containing (A) a silane-functionalized ethylene/α-olefin multi-block interpolymer (for example, a silane-grafted ethylene/α-olefin multi-block copolymer); (B) optionally, an ethylene/α-olefin multi-block interpolymer (for example, an ethylene/α-olefin multi-block copolymer); and (C) optionally, one or more additives.

In an embodiment, the foam bead has a diameter from 4 mm, or 5 mm to 6 mm, or 7 mm; and/or a length from 4 mm, or 5 mm to 6 mm, or 7 mm. In another embodiment, the foam bead has a diameter from 4 mm to 7 mm and/or a length from 4 mm to 7 mm.

In an embodiment, the foam bead is formed from a composition comprising, or consisting essentially of, or consisting of: (A) from 20 wt %, or 25 wt %, or 30 wt % to 35 wt %, or 40 wt %, or 45 wt %, or 50 wt %, or 55 wt %, or 60 wt %, or 65 wt %, or 70 wt %, or 75 wt %, or 80 wt %, or 85 wt %, or 90 wt %, or 95 wt %, or 98 wt %, or 99 wt %, or 100 wt % of the silane-functionalized ethylene/α-olefin multi-block interpolymer, or further the silane-grafted ethylene/α-olefin multi-block interpolymer; optionally, (B) from 0 wt %, or 10 wt %, or 15 wt %, or 20 wt %, or 25 wt %, or 30 wt %, or 35 wt %, or 40 wt %, or 45 wt %, or 50 wt %, or 55 wt %, or 60 wt % to 65 wt %, or 70 wt %, or 75 wt %, or 80 wt % of the ethylene/α-olefin multi-block interpolymer, or further the ethylene/α-olefin multi-block copolymer; and optionally, (C) from 0 wt %, or 0.01 wt % to 0.3 wt %, or 0.5 wt %, or 1 wt %, or 2 wt %, or 3 wt %, or 5 wt % optional additive, based on the total weight of the composition, or further based on the total weight of the foam bead. In an embodiment, the silane-functionalized ethylene/α-olefin multi-block interpolymer is a silane-functionalized ethylene/α-olefin multi-block copolymer. In an embodiment, the silane-grafted ethylene/α-olefin multi-block interpolymer is a silane-grafted ethylene/α-olefin multi-block copolymer. In an embodiment the ethylene/α-olefin multi-block interpolymer is an ethylene/α-olefin multi-block copolymer. Nonlimiting examples of suitable α-olefins include, for example, $C_3$, $C_4$, $C_5$, $C_6$ and $C_8$ α-olefins.

In an embodiment, the combined amount of (A) silane-functionalized ethylene/α-olefin multi-block interpolymer (for example, a silane-grafted ethylene/α-olefin multi-block copolymer) and (B) ethylene/α-olefin multi-block interpolymer (for example, an ethylene/α-olefin multi-block copolymer) equals at least 80 wt % of the composition. In another embodiment, the combined amount of (A) silane-functionalized ethylene/α-olefin multi-block interpolymer (for example, a silane-grafted ethylene/α-olefin multi-block copolymer) and (B) ethylene/α-olefin multi-block interpolymer (for example, an ethylene/α-olefin multi-block copolymer) equals from 80 wt %, or 85 wt %, or 90 wt % to 95 wt %, or 98 wt %, or 99 wt %, or 100 wt % of the total weight of the composition.

In an embodiment, the weight ratio of the (B) ethylene/α-olefin multi-block interpolymer (for example, an ethylene/α-olefin multi-block copolymer) and (A) silane-functionalized ethylene/α-olefin multi-block interpolymer (for example, a silane-grafted ethylene/α-olefin multi-block copolymer) is from 0, or 0.25, or 0.30, or 0.35, or 0.43, or 0.50, or 0.60, or 0.70, or 0.80, or 1.0, or 1.25, or 1.50, or 1.75, or 2.0, or 2.25, or 2.30, or 2.35, or 2.50. In a further embodiment, the weight ratio of the (B) ethylene/α-olefin multi-block interpolymer and (A) silane-functionalized ethylene/α-olefin multi-block interpolymer is from 0 to 2.50, or from 0.25 to 2.50, or from 1.0 to 2.35, or from 2.0 to 2.35.

In an embodiment, the foam bead has a gel content from 0%, or 0.1% to 1%, or 2%, or 3%, or 4%, or 5%. In an embodiment, the foam bead has a gel content from 0% to 5%, or from 0% to 3%, or from 0% to 1%. In an embodiment, the foam bead is not crosslinked. In other words, the foam bead has a gel content of 0%. A foam bead that is not crosslinked is advantageous because it provides a thermoplastic foam bead. In other words, the foam bead may be melt processed further to form a foamed structure, such as a sintered foam structure. Foam beads that have a gel content of greater than 50% cannot be melt processed to form a structure because the foam beads cannot melt together and fuse to form a single uniform structure.

In an embodiment, the foam bead has a single melting peak. In a further embodiment, the foam bead has a melting point, Tm, from 110° C., or 115° C., or 118° C., or 120° C. to 121° C., or 125° C., or 130° C., or 135° C. In another embodiment, the foam bead has a melting point, Tm, from 110° C. to 135° C., or from 110° C. to 130° C., or from 115° C. to 125° C.

In an embodiment, the foam bead has a heat of fusion, $H_f$, from 30 J/g, or 40 J/g, or 45 J/g, or 50 J/g, or 55 J/g to 60 J/g, or 65 J/g, or 70 J/g, or 75 J/g, or 80 J/g. In another embodiment, the foam bead has a heat of fusion, $H_f$, from 30 J/g to 80 J/g, or from 40 J/g to 80 J/g, or from 50 J/g to 75 J/g.

In an embodiment, the foam bead has a foam density of less than 0.20 g/cc. In another embodiment, the foam bead has a foam density from 0.05 g/cc, or 0.08 g/cc, or 0.09 g/cc, or 0.10 g/cc to 0.12 g/cc, or 0.14 g/cc, or 0.15 g/cc, or 0.19 g/cc, or less than 0.20 g/cc. In another embodiment, the foam bead has a density from 0.05 g/cc to less than 0.20 g/cc, or from 0.05 g/cc to 0.12 g/cc, or from 0.08 g/cc to 0.15 g/cc. Other features being equal, a lower foam density indicates a polymer or a polymer blend has improved foaming ability.

In an embodiment, the foam bead is formed from a composition comprising, or consisting essentially of, or consisting of: (A) from 20 wt %, or 25 wt %, or 30 wt % to 35 wt %, or 40 wt %, or 45 wt %, or 50 wt %, or 55 wt %, or 60 wt %, or 65 wt %, or 70 wt %, or 75 wt %, or 80 wt %, or 85 wt %, or 90 wt %, or 95 wt %, or 98 wt %, or 99 wt %, or 100 wt % of the silane-functionalized ethylene/α-olefin multi-block interpolymer, or further the silane-grafted ethylene/α-olefin multi-block interpolymer; optionally, (B) from 0 wt %, or 10 wt %, or 15 wt %, or 20 wt %, or 25 wt %, or 30 wt %, or 35 wt %, or 40 wt %, or 45 wt %, or 50 wt %, or 55 wt %, or 60 wt % to 65 wt %, or 70 wt %, or 75 wt %, or 80 wt % of the ethylene/α-olefin multi-block interpolymer, or further the ethylene/α-olefin multi-block copolymer; and optionally, (C) from 0 wt %, or 0.01 wt % to 0.3 wt %, or 0.5 wt %, or 1 wt %, or 2 wt %, or 3 wt %, or 5 wt % optional additive, based on the total weight of the composition, or further based on the total weight of the foam bead. In an embodiment, the foam bead has one, some, or all of the following properties: (i) a gel content from 0%, or 0.1% to 1%, or 2%, or 3%, or 4%, or 5%; and/or (ii) a single melting peak; and/or (iii) a melting point, Tm, from 110° C., or 115° C., or 118° C., or 120° C. to 121° C., or 125° C., or 130° C., or 135° C.; and/or (iv) a heat of fusion, $H_f$, from 40 J/g, or 45 J/g, or 50 J/g, or 55 J/g to 60 J/g, or 65 J/g, or 70 J/g, or 75 J/g, or 80 J/g; and/or (v) a foam density of less than 0.20 g/cc. In another embodiment, the foam bead has a foam density from 0.05 g/cc, or 0.08 g/cc, or 0.09 g/cc, or 0.10 g/cc to 0.12 g/cc, or 0.14 g/cc, or 0.15 g/cc, or 0.19 g/cc, or less than 0.20 g/cc. In a further embodiment, the foam bead has all of the above properties (i)-(v). In an embodiment, the silane-functionalized ethylene/α-olefin multi-block interpolymer is a silane-functionalized ethylene/α-olefin multi-block copolymer. In another embodiment, the silane-grafted ethylene/α-olefin multi-block interpolymer is a silane-grafted ethylene/α-olefin multi-block copolymer. In an embodiment the ethylene/α-olefin multi-block interpolymer is an ethylene/α-olefin multi-block copolymer. Nonlimiting examples of suitable α-olefins include, for example, $C_3$, $C_4$, $C_5$, $C_6$ and $C_8$ α-olefins.

It is understood that the sum of the components in each of the compositions and foam beads disclosed herein, including the foregoing compositions, yields 100 weight percent (wt %).

A nonlimiting example of a process for producing foam beads is described in Polymer 56 (2015) 5-19, the entire contents of which are herein incorporated by reference.

In an embodiment, the composition components (i.e., (A) the silane-functionalized ethylene/α-olefin multi-block interpolymer (for example, a silane-grafted ethylene/α-olefin multi-block copolymer); (B) optionally, the ethylene/α-olefin multi-block interpolymer (for example, an ethylene/α-olefin multi-block copolymer); and (C) optionally, one or more additives) are dry-blended, the blend is extruded, and the extrudate is pelletized. The pellet may have a diameter from 2.0 mm, or 2.3 mm to 3.0 mm, or 3.5 mm and a length from 2.0 mm, or 2.3 mm to 3.0 mm, or 3.5 mm. In an embodiment, the composition is in the form of a pellet with a diameter from 2.3 mm to 3.0 mm and a length from 2.3 mm to 3.0 mm. The pellets are then saturated with a blowing agent to form a foam bead.

A nonlimiting example of a suitable blowing agent is a physical blowing agent. Nonlimiting examples of suitable physical blowing agents include an inert gas such as nitrogen ($N_2$), a carbon gas (e.g., CO, $CO_2$, etc.), helium, and argon; a hydrocarbon such as methane, propane, and butane (e.g., isobutane), pentane; and a halogenated hydrocarbon such as dichlorodifluoromethane, dichloromonofluoromethane, monochlorodifluoromethane, trichloromonofluoromethane, monochloropentafluoroethane, and trichlorotrifluoroethane. In an embodiment, the physical blowing agent is carbon dioxide ($CO_2$). A nonlimiting example of a suitable carbon dioxide is supercritical carbon dioxide. Supercritical carbon dioxide is a fluid state of carbon dioxide that is held at or above its critical temperature (31.10° C.) and critical pressure (7.39 MPa). In an embodiment, the blowing agent is a physical blowing agent to the exclusion of chemical blowing agents. In an embodiment, the pellet is contacted with the physical blowing agent at a temperature of from 100° C., or 110° C., or 115° C., or 120° C. to 125° C., or 130° C., or 135° C.

In an embodiment, the pellet is contacted with the physical blowing agent (e.g., supercritical carbon dioxide) via impregnation of the pellets with the blowing agent in an autoclave. The impregnating occurs at a temperature within ±0° C. to ±10° C., or ±30° C. of the melting point of the silane-functionalized ethylene/α-olefin multi-block interpolymer and/or the optional ethylene/α-olefin multi-block copolymer. In a further embodiment, the impregnating occurs at a temperature from 100° C., or 110° C., or 115° C., or 120° C. to 125° C., or 130° C., or 135° C. In an embodiment, the impregnating occurs with a physical blowing agent pressure of from 5 MPa, or 8 MPa, or 10 MPa, or 11 MPa to 12 MPa, or 13 MPa, or 15 MPa, or 20 MPa, or 25 MPa, or 30 MPa and a saturation time of from 0.5 hours, or 1.0 hour to 1.5 hours, or 2.0 hours, or 3.0 hours. Following the saturation time, the autoclave is depressed to 25° C. and 0.1 MPa. During depression, the impregnated pellets expand to foam beads.

The foam bead may comprise two or more embodiments discussed herein.

The instant disclosure provides a sintered foam structure formed from the present foam beads.

E. Sintered Foam Structure

The instant disclosure provides a sintered foam structure. The sintered foam structure is formed from foam beads that are formed from a composition containing (A) a silane-functionalized ethylene/α-olefin multi-block interpolymer.

A sintered foam structure may comprise a combination of two or more embodiments as described herein.

In an embodiment, the present sintered foam structure is formed from foam beads that are formed from a composition further containing (B) an ethylene/α-olefin multi-block interpolymer. In an embodiment, the present sintered foam structure is formed from foam beads that are formed from a composition further containing (C) one or more optional additives.

The (A) a silane-functionalized ethylene/α-olefin multi-block interpolymer, (B) an ethylene/α-olefin multi-block interpolymer, and (C) optional additive may be any respective (A) a silane-functionalized ethylene/α-olefin multi-block interpolymer, (B) an ethylene/α-olefin multi-block interpolymer, and (C) optional additive disclosed herein.

The sintered foam structure is an article formed via sintering of foam beads. The foam beads may be any foam bead disclosed herein. A nonlimiting method of sintering includes steam-chest molding. Steam-chest molding occurs at a temperature from 80° C., or 90° C. to 100° C., or 110° C., or 120° C., or 130° C., or 140° C. and/or a pressure from 0.05 MPa, or 0.1 MPa to 0.2 MPa, or 0.4 MPa. In another embodiment, the sintered foam structure is formed as described in Polymer 56 (2015) 5-19, the entire contents of which are herein incorporated by reference.

In an embodiment, the sintered foam structure is formed from foam beads that are formed from a composition comprising, or consisting essentially of, or consisting of: (A) from 20 wt %, or 25 wt %, or 30 wt % to 35 wt %, or 40 wt %, or 45 wt %, or 50 wt %, or 55 wt %, or 60 wt %, or 65 wt %, or 70 wt %, or 75 wt %, or 80 wt %, or 85 wt %, or 90 wt %, or 95 wt %, or 98 wt %, or 99 wt %, or 100 wt % of the silane-functionalized ethylene/α-olefin multi-block interpolymer, or further the silane-grafted ethylene/α-olefin multi-block interpolymer; optionally, (B) from 0 wt %, or 10 wt %, or 15 wt %, or 20 wt %, or 25 wt %, or 30 wt %, or 35 wt %, or 40 wt %, or 45 wt %, or 50 wt %, or 55 wt %, or 60 wt % to 65 wt %, or 70 wt %, or 75 wt %, or 80 wt % of the ethylene/α-olefin multi-block interpolymer, or further the ethylene/α-olefin multi-block copolymer; and optionally, (C) from 0 wt %, or 0.01 wt % to 0.3 wt %, or 0.5 wt %, or 1 wt %, or 2 wt %, or 3 wt %, or 5 wt % optional additive, based on the total weight of the composition, or further based on the total weight of the foam bead, or further based on the total weight of the sintered foam structure. In an embodiment, the silane-functionalized ethylene/α-olefin multi-block interpolymer is a silane-functionalized ethylene/α-olefin multi-block copolymer. In another embodiment, the silane-grafted ethylene/α-olefin multi-block interpolymer is a silane-grafted ethylene/α-olefin multi-block copolymer. In an embodiment the ethylene/α-olefin multi-block interpolymer is an ethylene/α-olefin multi-block copolymer. Nonlimiting examples of suitable α-olefins include, for example, $C_3$, $C_4$, $C_5$, $C_6$ and $C_8$ α-olefins.

In an embodiment, the combined amount of (A) silane-functionalized ethylene/α-olefin multi-block interpolymer (for example, a silane-grafted ethylene/α-olefin multi-block copolymer) and (B) ethylene/α-olefin multi-block interpolymer (for example, an ethylene/α-olefin multi-block copolymer) equals at least 80 wt % of the composition, or further of the sintered foam structure. In another embodiment, the combined amount of (A) silane-functionalized ethylene/α-olefin multi-block interpolymer (for example, a silane-grafted ethylene/α-olefin multi-block copolymer) and (B) ethylene/α-olefin multi-block interpolymer (for example, an ethylene/α-olefin multi-block copolymer) equals from 80 wt %, or 85 wt %, or 90 wt % to 95 wt %, or 98 wt %, or 99 wt %, or 100 wt % of the total weight of the composition, or further of the sintered foam structure.

In an embodiment, the weight ratio of the (B) ethylene/α-olefin multi-block interpolymer (for example, an ethylene/α-olefin multi-block copolymer) and (A) silane-functionalized ethylene/α-olefin multi-block interpolymer (for example, a silane-grafted ethylene/α-olefin multi-block copolymer) is from 0, or 0.25, or 0.30, or 0.35, or 0.43, or 0.50, or 0.60, or 0.70, or 0.80, or 1.0, or 1.25, or 1.50, or 1.75, or 2.0, or 2.25, or 2.30, or 2.35, or 2.50. In a further embodiment, the weight ratio of the (B) ethylene/α-olefin multi-block interpolymer and (A) silane-functionalized ethylene/α-olefin multi-block interpolymer is from 0 to 2.50, or from 0.25 to 2.50, or from 1.0 to 2.35, or from 2.0 to 2.35.

In an embodiment, the sintered foam structure has a gel content greater than 5%. In another embodiment, the sintered foam structure has a gel content from greater than 5%, or 6%, or 7%, or 10%, or 12%, or 15%, or 17% to 20%, or 25%, or 30%, or 35%, or 40%, or 45%, or 50%, or 55%, or 60%, or 65%, or 70%, or 75%, or 80%. In another embodiment, the sintered foam structure has a gel content from greater than 5% to 80%, or from 10% to 60%, or from 10% to 40%, or from 15% to 30%, or from 17% to 25%.

In an embodiment, the sintered foam structure has an Asker C hardness from 20, or 25, or 30, or 31 to 33, or 35, or 40, or 50, or 60, or 70. In another embodiment, the sintered foam structure has an Asker C hardness from 20 to 70, or from 30 to 70, or from 31 to 70, or from 31 to 50.

In an embodiment, the sintered foam structure has a foam density foam density of less than 0.20 g/cc. In another embodiment, the sintered foam structure has a foam density from 0.05 g/cc, or 0.08 g/cc, or 0.09 g/cc, or 0.10 g/cc, or 0.15 g/cc, or 0.17 g/cc to 0.18 g/cc, or 0.19 g/cc, or less than 0.20 g/cc. In another embodiment, the sintered foam structure has a density from 0.05 g/cc to less than 0.20 g/cc, or from 0.05 g/cc to 0.18 g/cc.

In an embodiment, the sintered foam structure has a falling ball rebound from 50%, or 55%, or 60%, or 61% to 62%, or 70%, or 80%, or 90%. In another embodiment, the sintered foam structure has a falling ball rebound from 50% to 90%, or from 60% to 85%, or from 61% to 80%.

In an embodiment, the sintered foam structure has an average strain at break from 40%, or 45%, or 50%, or 55%, or 60% to 65%, or 70%, or 75%, or 80%. In another embodiment, the sintered foam structure has an average strain at break from 40% to 80%, or from 45% to 80%, or from 50% to 70%.

In an embodiment, the sintered foam structure has an average stress at break from 0.40 MPa, or 0.45 MPa, or 0.50 MPa, or 0.54 MPa to 0.60 MPa, or 0.65 MPa, or 0.70 MPa, or 0.80 MPa. In another embodiment, the sintered foam structure has an average stress at break from 0.40 MPa to 0.80 MPa, or from 0.45 MPa to 0.80 MPa, or from 0.50 MPa to 0.80 MPa, or from 0.50 MPa to 0.70 MPa.

In an embodiment, the sintered foam structure has a Type C Tear from 3.0 N/mm, or 3.5 N/mm, or 4.0 N/mm, or 4.5 N/mm, or 5.0 N/mm to 5.5 N/mm, or 6.0 N/mm, or 7.0 N/mm, or 10 N/mm. In another embodiment, the sintered foam structure has a Type C Tear from 3.0 N/mm to 10 N/mm, or from 4.0 N/mm to 7.0 N/mm, or from 5.0 N/mm to 7.0 N/mm.

In an embodiment, the sintered foam structure has a Split Tear from 0.5 N/mm, or 1.0 N/mm, or 1.1 N/mm to 1.2 N/mm, or 1.5 N/mm, or 2.0 N/mm. In another embodiment, the sintered foam structure has a Split Tear from 0.5 N/mm to 2.0 N/mm, or from 1.0 N/mm to 1.5 N/mm, or from 1.1 N/mm to 1.5 N/mm.

In an embodiment, the sintered foam structure has a linear shrinkage (70° C./40 minutes) of less than 5%. In another embodiment, the sintered foam structure has a linear shrinkage (70° C./40 minutes) from 0.1%, or 0.5%, or 1.0% to 3.3%, or 3.5%, or 4.0%, or 4.5%, or less than 5.0%. In another embodiment, the sintered foam structure has a linear shrinkage (70° C./40 minutes) from 0.1% to less than 5.0%, or from 0.1% to 4.0%, or from 1.0% to 4.0%.

In an embodiment, the sintered foam structure has a compression set (50%, 50° C./6 hours) of less than 90%, or less than 80%, or less than 70%. In another embodiment, the sintered foam structure has a compression set (50%, 50° C./6 hours) from 50%, or 55%, or 60%, or 65% to 70%, or 75%, or 80%, or 85%, or 90%.

In an embodiment, the sintered foam structure is formed from foam beads that are formed from a composition comprising, or consisting essentially of, or consisting of: (A) from 20 wt %, or 25 wt %, or 30 wt % to 35 wt %, or 40 wt %, or 45 wt %, or 50 wt %, or 55 wt %, or 60 wt %, or 65 wt %, or 70 wt %, or 75 wt %, or 80 wt %, or 85 wt %, or 90 wt %, or 95 wt %, or 98 wt %, or 99 wt %, or 100 wt % of the silane-functionalized ethylene/α-olefin multi-block interpolymer, or further the silane-grafted ethylene/α-olefin multi-block interpolymer; optionally, (B) from 0 wt %, or 10 wt %, or 15 wt %, or 20 wt %, or 25 wt %, or 30 wt %, or 35 wt %, or 40 wt %, or 45 wt %, or 50 wt %, or 55 wt %, or 60 wt % to 65 wt %, or 70 wt %, or 75 wt %, or 80 wt % of the ethylene/α-olefin multi-block interpolymer, or further the ethylene/α-olefin multi-block copolymer; and optionally, (C) from 0 wt %, or 0.01 wt % to 0.3 wt %, or 0.5 wt %, or 1 wt %, or 2 wt %, or 3 wt %, or 5 wt % optional additive, based on the total weight of the composition, or further based on the total weight of the foam bead, or further based on the total weight of the sintered foam structure. In an embodiment, the sintered foam structure has one, some, or all of the following properties: (i) a gel content from greater than 5%, or 6%, or 7%, or 10%, or 12%, or 15%, or 17% to 20%, or 25%, or 30%, or 35%, or 40%, or 45%, or 50%, or 55%, or 60%, or 65%, or 70%, or 75%, or 80%; and/or (ii) an Asker C hardness from 20, or 25, or 30, or 31 to 33, or 35, or 40, or 50, or 60, or 70; and/or (iii) a foam density from 0.05 g/cc, or 0.09 g/cc, or 0.10 g/cc, or 0.15 g/cc, or 0.17 g/cc to 0.18 g/cc, or 0.19 g/cc, or less than 0.20 g/cc; and/or (iv) a falling ball rebound from 50%, or 55%, or 60%, or 61% to 62%, or 70%, or 80%, or 90%; and/or (v) an average strain at break from 40%, or 45%, or 50%, or 55%, or 60% to 65%, or 70%, or 75%, or 80%; and/or (vi) an average stress at break from 0.40 MPa, or 0.45 MPa, or 0.50 MPa, or 0.54 MPa to 0.60 MPa, or 0.65 MPa, or 0.70 MPa, or 0.80 MPa; and/or (vii) a Type C Tear from 3.0 N/mm, or 3.5 N/mm, or 4.0 N/mm, or 4.5 N/mm, or 5.0 N/mm to 5.5 N/mm, or 6.0 N/mm, or 7.0 N/mm, or 10 N/mm; and/or (viii) a Split Tear from 0.5 N/mm, or 1.0 N/mm, or 1.1 N/mm to 1.2 N/mm, or 1.5 N/mm, or 2.0 N/mm; and/or (ix) a linear shrinkage (70° C./40 minutes) from 0.1%, or 0.5%, or 1.0% to 3.3%, or 3.5%, or 4.0%, or 4.5%, or less than 5.0%; and/or (x) a compression set (50%, 50° C./6 hours) of less than 90%, or less than 80%, or less than 70%. In a further embodiment, the sintered foam structure has all of the above properties (i)-(x). In an embodiment, the silane-functionalized ethylene/α-olefin multi-block interpolymer is a silane-functionalized ethylene/α-olefin multi-block copolymer. In another embodiment, the silane-grafted ethylene/α-olefin multi-block interpolymer is a silane-grafted ethylene/α-olefin multi-block copolymer. In an embodiment the ethylene/α-olefin multi-block interpolymer is an ethylene/α-olefin multi-block copolymer. Nonlimiting examples of suitable α-olefins include, for example, $C_3$, $C_4$, $C_5$, $C_6$ and $C_8$ α-olefins.

Nonlimiting examples of suitable sintered foam structures include footwear (e.g., midsoles of footwear), packaging, sporting goods, construction materials, and insulation.

The sintered foam structure may comprise two or more embodiments discussed herein.

The instant disclosure also provides an article with at least one component formed from the present sintered foam structure. The sintered foam structure may be any sintered foam structure disclosed herein. Nonlimiting examples of suitable articles include footwear, packaging, sporting goods, construction materials, and insulation.

TEST METHODS

Asker C Hardness of sintered foam structures was measured in accordance with ASTM D2240 on plaques with the dimensions 20 cm (length)×10 cm (width)×1-2 cm (thickness) (original sintered foam structure with two skin layers). One sample was tested for each example. Each sample was measured at least three times (with a 5 second latency between each measurement), across the surface of the sample (i.e., different positions along the sample). The average was recorded.

Average Strain at Break was measured in accordance with ASTM D638. A sintered foam structure in the form of a plaque with the dimensions 20 cm (length)×10 cm (width)× 1-2 cm (thickness) (original sintered foam structure with two skin layers), was die cut into samples following the Type 4 specimen (one side skin on, dogbone, thickness 3-5 mm). The strain at break was measured at a testing speed of 20 inches/minute. The average of three samples was reported. The result was recorded in INSTRON 5565 in terms of percentage.

Average Stress at Break was measured in accordance with ASTM D638. A sintered foam structure in the form of a plaque with the dimensions 20 cm (length)×10 cm (width)× 1-2 cm (thickness) (original sintered foam structure with two skin layers) was die cut into samples following the Type 4 specimen (one side skin on, dogbone, thickness 3-5 mm). The stress at break was measured at a testing speed of 20 inches/minute. The average of three samples was reported. The result was recorded in INSTRON 5565 in terms of MPa.

Compression set was measured in accordance with ASTM D395, Method B, under the conditions of 50% compression at 50° C. for 6 hours. The top skin layer was removed from a sintered foam structure (using a horizontal band saw), in the form of a plaque, with the dimensions 20 cm (length)×10 cm (width)×1-2 cm (thickness). Samples were then die cut from the plaque. Samples were cylinder shaped having a 29 mm diameter and a 19 mm thickness. Two samples were tested for each example, and the average was reported. Compression set was calculated using the following Equation: Compression Set=$(T_1-T_2)/(T_1-T_0) \times 100$; where $T_0$ is the interval distance of the apparatus; $T_1$ is the sample thickness before testing; and $T_2$ is the sample thickness after recovered for 24 hours.

Density of the foam beads was measured by using water displacement method according to ASTM D792. The result was recorded in grams (g) per cubic centimeter (g/cc or $g/cm^3$).

Density of the polymers was measured in accordance with ASTM D792, Method B. The result was recorded in grams (g) per cubic centimeter (g/cc or g/cm$^3$).

Falling ball rebound was measured by dropping a ⅝ inch (1.59 cm) diameter steel ball from a height of 500 mm onto a sintered foam structure in the form of a plaque with the dimensions 20 cm (length)×10 cm (width)×1-2 cm (thickness) (original sintered foam structure with two skin layers). The distance the ball rebounds off of the top surface of the plaque was measured in millimeters (mm). The falling ball rebound was calculated as a percentage using the following Equation: Falling Ball Rebound=(ball rebound distance× 100)/500.

Foam density of sintered foam structures was measured by weighing a plaque with the dimensions 20 cm (length)× 10 cm (width)×1-2 cm (thickness) (original sintered foam structure with two skin layers), in grams, and determining the volume (in cubic centimeter, cm$^3$) of the plaque using the length, width, and thickness of the plaque. The result (weight/volume) was recorded in g/cm$^3$ (g/cc).

Gel content was measured by extraction in boiling decalin at 180° C. for 5 hours, according to ASTM D2765. The result was recorded in percent (%), based on the total weight of the material. The percent gel normally increases with increasing crosslinking levels.

Linear shrinkage was measured on a vertically cut sample (vertical band saw) from an original sintered foam structure, in the form of a plaque with the dimensions 20 cm (length)× 10 cm (width)×1-2 cm (thickness). Samples were cut using a vertical band saw to a sample size of 75 mm×75 mm×10 mm. Each sample contained a top skin layer along the "10 mm" thickness, and a bottom skin layer along the "10 mm" thickness. The length ($L_0$) of each sample was measured. Then, the samples were placed into an oven pre-heated to 70° C. The samples were heated in the oven for 40 minutes. After removing the samples from the oven, the samples were cooled for 24 hours at room temperature (23° C.). Then, the length ($L_1$) of each sample was measured. The change in length of the sample, reported as a percentage, is the linear shrinkage ($L_0-L_1$)/($L_0$).

Melt index (I2) was measured at 190° C. under a load of 2.16 kg according to ASTM D1238. The result was recorded in grams eluted per 10 minutes (g/10 min).

Shore A hardness was measured in accordance with ASTM D2240.

Type C Tear was measured in accordance with ASTM D624. A sintered foam structure in the form of a plaque with the dimensions 20 cm (length)×10 cm (width)×1-2 cm (thickness) was cut into samples following the Type C specimen specified in ASTM D624 (one skin on, thickness=3 mm). Type C Tear was measured at a testing speed of 20 inches/minute. The result was recorded in Newtons per millimeter (N/mm). The average of three samples was recorded.

Split Tear was measured in accordance with ASTM D3574 Test F. A sintered foam structure in the form of a plaque with the dimensions 20 cm (length)×10 cm (width)× 1-2 cm (thickness) was cut (vertical band saw) into samples with the following dimensions: 15 cm (length)×12.5 cm (width)×1.0 cm (thickness). Each sample contained a top skin layer along the "1 cm" thickness, and a bottom skin layer along the "1 cm" thickness. Split tear was measured with a notch depth of 2.5-4 cm, through a skin layer, perpendicular to the direction of the thickness) at a testing speed of 50 mm/minute. The result was recorded in Newtons per millimeter (N/mm). The average of three samples was recorded.

Differential Scanning Calorimetry (DSC)

Differential Scanning calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler was used to perform this analysis. During testing, a nitrogen purge gas flow of 50 ml/min was used. Each sample was melt pressed into a thin film at 190° C.; the melted sample was then air-cooled to room temperature (25° C.). A 3-10 mg, 6 mm diameter specimen was extracted from the cooled polymer, weighed, placed in a light aluminum pan (50 mg), and crimped shut. Analysis was then performed to determine its thermal properties.

The thermal behavior of the sample was determined by ramping the sample temperature up and down to create a heat flow versus temperature profile. First, the sample was rapidly heated to 180° C. and held isothermal for 3 minutes in order to remove its thermal history. Next, the sample was cooled to −80° C. at a 10° C./minute cooling rate and held isothermal at −80° C. for 3 minutes. The sample was then heated to 180° C. (this is the "second heat" ramp) at a 10° C./minute heating rate. The cooling and second heating curves were recorded. The values determined are extrapolated onset of melting, $T_m$, and extrapolated onset of crystallization, $T_c$. Heat of fusion ($H_f$) (in Joules per gram), and the calculated % crystallinity for polyethylene samples using the following Equation: % Crystallinity=(($H_f$)/292 J/g)×100.

The heat of fusion ($H_f$) (also known as melt enthalpy) and the peak melting temperature were reported from the second heat curve.

Melting point, $T_m$, was determined from the DSC heating curve by first drawing the baseline between the start and end of the melting transition. A tangent line was then drawn to the data on the low temperature side of the melting peak. Where this line intersects the baseline is the extrapolated onset of melting ($T_m$). This is as described in Bernhard Wunderlich, *The Basis of Thermal Analysis, in Thermal Characterization of Polymeric Materials* 92, 277-278 (Edith A. Turi ed., 2d ed. 1997).

The half peak width was determined from the DSC heating curve by measuring the height of the peak maximum from the baseline, and determining the peak width at the ½ point of the peak maximum.

Gel Permeation Chromatography (GPC) for Molecular Weight

A high temperature gel permeation chromatography (GPC) system, equipped with Robotic Assistant Deliver (RAD) system was used for sample preparation and sample injection. The concentration detector was an Infra-red detector (IR-5) from Polymer Char Inc. (Valencia, Spain).

Data collection was performed using a Polymer Char DM 100 Data acquisition box. The carrier solvent was 1,2,4-trichlorobenzene (TCB). The system was equipped with an on-line solvent degas device from Agilent. The column compartment was operated at 150° C. The columns were four Mixed A LS 30 cm, 20 micron columns. The solvent was nitrogen-purged 1,2,4-trichlorobenzene (TCB) containing approximately 200 ppm 2,6-di-t-butyl-4-methylphenol (BHT). The flow rate was 1.0 mL/min, and the injection volume was 200 μl. A "2 mg/mL" sample concentration was prepared by dissolving the sample in $N_2$ purged and preheated TCB (containing 200 ppm BHT), for 2.5 hours at 160° C., with gentle agitation.

The GPC column set was calibrated by running twenty narrow molecular weight distribution polystyrene standards. The molecular weight (MW) of the standards ranges from 580 g/mol to 8,400,000 g/mol, and the standards were contained in six "cocktail" mixtures. Each standard mixture had at least a decade of separation between individual molecular weights. The equivalent polypropylene molecular weights of each PS standard were calculated by using following equation, with reported Mark-Houwink coefficients for polypropylene (Th. G. Scholte, N. L. J. Meijerink, H. M. Schoffeleers, & A. M. G. Brands, J. Appl. Polym. Sci., 29, 3763-3782 (1984)) and polystyrene (E. P. Otocka, R. J. Roe, N. Y. Hellman, & P. M. Muglia, Macromolecules, 4, 507 (1971)):

$$M_{PP} = \left(\frac{K_{PS} M_{PS}^{a_{PS}+2}}{K_{PP}}\right)^{\frac{1}{a_{PP}+1}}, \quad (Eq\ 1)$$

where $M_{pp}$ is PP equivalent MW, $M_{PS}$ is PS equivalent MW, log K and a values of Mark-Houwink coefficients for PP and PS are listed below.

| Polymer | a | log K |
|---|---|---|
| Polypropylene | 0.725 | −3.721 |
| Polystyrene | 0.702 | −3.900 |

A logarithmic molecular weight calibration was generated using a fourth order polynomial fit as a function of elution volume. Number average and weight average molecular weights were calculated according to the following equations:

$$M_n = \frac{\sum^i Wf_i}{\sum^i Wf_i / M_i}, \quad (Eq\ 2)$$

$$M_w = \frac{\sum^i (Wf_i * M_i)}{\sum^i (Wf_i)}, \quad (Eq\ 3)$$

where $Wf_i$ and $M_i$ are the weight fraction and molecular weight of elution component i, respectively.

The mass detector constant, laser light scattering detector constant and viscometer detector constant were determined using a standard reference (reference polymer is a linear polyethylene homopolymer) with a known value of weight average molecular weight (Mw=120,000 g/mol; dn/dc=−0.104 mL/g; MWD=2.9) and intrinsic viscosity (1.873 dL/g). The chromatographic concentrations were assumed low enough to eliminate addressing second Virial coefficient effects (concentration effects on molecular weight).

The Systematic Approach for the determination of detector offset was implemented in a manner consistent with that published by Balke & Mourey et. al. (Mourey & Balke, Chromatography Polym. Chpt 12, (1992)) (Balke, Thitiratsakul, Lew, Cheung & Mourey, Chromatography Polym. Chpt 13, (1992)), using data obtained from the two detectors, while analyzing a standard reference (a linear polyethylene homopolymer) with a known value of weight average molecular weight (Mw=120,000 g/mol; do/dc=−0.104 mL/g; MWD=2.9) and intrinsic viscosity (1.873 dL/g) and narrow polystyrene standards. The Systematic Approach was used to optimize each detector offset to give molecular weight results as close as possible to those observed using the conventional GPC method.

The absolute weight average molecular weight Mw of the samples were characterized by the LS detector and IR-5 concentration detector using following equation:

$$Mw(abs) = K_{LS} * \frac{\sum (LS_i)}{\sum (IR_i)}, \quad (Eq\ 4)$$

where $\Sigma(LS_i)$ is the response area of the LS detector, $\Sigma(IR_i)$ is the response area of the IR-5 detector, and $K_{LS}$ is the instrument constant which was determined using the standard reference (a linear polyethylene homopolymer) with a known value of weight average molecular weight (Mw=120,000 g/mol; dn/dc=−0.104 mL/g; MWD=2.9), intrinsic viscosity (1.873 dL/g) and concentration.

Some embodiments of the present disclosure will now be described in detail in the following Examples.

EXAMPLES

Materials used to produce foam beads and sintered foam structures are shown in Table 1 below.

TABLE 1

| Starting Materials | | |
|---|---|---|
| Component | Specification | Source |
| INFUSE 9100 | ethylene/1-octene multi-block copolymer density = 0.877 g/cc; Shore A = 75; melt index (12) = 1 g/10 min; melting point = 120° C. | The Dow Chemical Co. |
| INFUSE D9130.05 | ethylene/1-octene multi-block copolymer density = 0.886 g/cc; Shore A = 80; melt index (12) = 1.5 g/10 min; melting point = 123.5° C.; single melting peak; $H_f$ = 52.2 J/g | The Dow Chemical Co. |
| XIAMETER OFS-6300 | vinyltrimethoxysilane (VTMS) | Dow Corning |
| LUPEROX 101 | 2,5 dimethyl-2,5 di-(tert-butylperoxy) hexane | Arkema |

A. Preparation of Silane-Grafted Ethylene/Octene Multi-Block Copolymer

Silane-grafted ethylene/1-octene multi-block copolymer was prepared on a 40 mm diameter, 48 L/D 12-barrel ZSK-40 Coperion twin-screw extruder. The line was equipped with a 135 kW motor and had a maximum speed of 1200 rotations per minute (RPM). Ethylene/octene multi-block copolymer (INFUSE 9100 or INFUSE D9130.05) was fed into the twin-screw extruder by loss in weight feeder. To prevent polymer oxidation, nitrogen was fed at the second barrel during the compounding process to sweep oxygen from the system. Melt discharge temperatures were measured using a hand-held thermocouple placed directly in the melt stream (Barrel set temperatures, from hopper to die, were 23/60/60/60/190/230/230/230/230/190/190/180° C.). A mixture of silane (XIAMETER OFS-6300) and peroxide (LUPEROX 101) was formed and injected through the liquid pump into the extruder at Barrel 6.

In order to minimize the concentration of volatile components and residual silane in the melt, a vacuum system was used to remove residual volatile components from the melt at Barrel 11 in the process. A vacuum of 0.065-0.070 MPa was used.

An underwater pelletizer with a 16-hole die was used to produce compounded pellets. Eight of the 16 holes were plugged to suppress the formation of pellet "chains" during pelletizing. A 6-blade pelletizing hub was used. The pellet water temperature was kept below 15° C. to aid in pelletization.

The obtained silane-grafted ethylene/1-octene multi-block copolymer had a grafted silane level of 1.20 wt % for INFUSE 9100 (Si-g-INFUSE 9100) and 1.53 wt % for INFUSE D9130.05 (Si-g-INFUSE D9130.05), based on the total weight of the silane-grafted ethylene/octene multi-block copolymer, as measured using Fourier transform infrared spectroscopy (FTIR) according to Chuanmei Jiao et al., *Silane Grafting and Crosslinking of Ethylene-Octene Copolymer*, 41 European Polymer J. 1204 (2005), the entire contents of which are incorporated herein by reference.

The obtained Si-g-INFUSE 9100 had a melt index (I2) of 0.5 g/10 min; a density of 0.877 g/cc; a melting point of 120° C.; and exhibits a single melting peak.

The obtained Si-g-INFUSE D9130.05 had a melt index (I2) of 0.12 g/10 min; a density of 0.889 g/cc; a melting point of 119.6° C.; and exhibits a single melting peak.

B. Pelletizing

The Si-g-INFUSE 9100 (produced as described above) and ethylene/octene multi-block copolymer (INFUSE D9130.05) were premixed by dry blending. Then, the premixed dry blend was fed into the hopper of a Werner & Pfleiderer ZSK 40 Mc Plus co-rotating intermeshing twin screw extruder. The temperature profile was as follows: 180/180/180/180/185/185/185/180/180° C. (die).

An underwater pelletizer from Gala Industries was used to prepare small round-shaped pellets containing the extrudate. The pellets had a diameter around 1-3 mm, and roughly 100~150 counts/gram (Ex 2 Pellet).

Pellets were also formed, as discussed above, but containing INFUSE D9130.05, and no silane-grafted ethylene/octene multi-block copolymer (CS 1 Pellet).

Pellets were also formed, as discussed above, but containing Si-g-INFUSE D9130.05, and no ethylene/octene multi-block copolymer (Ex 3 Pellet).

The composition and properties of the pellets are provided below in Table 2.

TABLE 2

Pellet Composition and Properties*

| | INFUSE D9130.05 (wt %) | Si-g-INFUSE 9100 (wt %) | Si-g-INFUSE D9130.05 (wt %) | Melting Peak | Tm (° C.) | H$_f$ (J/g) | Half Peak Width (° C.) |
|---|---|---|---|---|---|---|---|
| CS 1 Pellet | 100 | — | — | Single | 123.5 | 52.2 | 7.1 |
| Ex 2 Pellet | 70 | 30 | — | Single | 121.1 | 51.6 | 6.4 |
| Ex 3 Pellet | — | — | 100 | Single | 119.6 | 51.5 | 6.0 |

*wt % in Table 2 is based on the total weight of the pellet
CS = comparative sample C. Production of Foam Beads Pellets are fed into an auto-clave equipped with a heating unit and gas injection valve. The auto-clave is heated to the foaming temperature provided in Table 3 below. At the same time, a blowing agent (high pressure $CO_2$) is injected into the auto-clave for saturation (0.5~2 hours). The auto-clave pressure varies depending on the resin type, but is typically 50-200 bar. After the polymer is fully saturated, a fast depressurization occurs and the foamed beads are formed. The foamed beads are conditioned at room temperature (23° C.) for several days to allow gas exchange between inside and outside of the foam beads.

The composition and properties of the foam beads are provided below in Table 3.

TABLE 3

Composition and Properties of Foam Beads*

| | Composition | Foaming Temp. (° C.) | Foam Density (g/cm³) | Melting Peak | Tm (° C.) | H$_f$ (J/g) | Half Peak Width (° C.) | Gel Content (%) |
|---|---|---|---|---|---|---|---|---|
| CS 1 Foam Bead | CS 1 Pellet (100 wt % INFUSE D9130.05) | 112 | 0.12-0.14 | Single | 120.2 | 60.4 | 3.5 | 0% |
| Ex 2 Foam Bead | Ex 2 Pellet (70 wt % INFUSE D9130.05/ 30 wt % Si-g-INFUSE 9100) | 115 | 0.10-0.12 | Single | 120.2 | 59.6 | 2.7 | 1% |
| Ex 3 Foam Bead | Ex 3 Pellet (100 wt % Si-g-INFUSE D9130.05) | 101 | 0.15-0.20 | Single | 118.9 | 53.2 | 6.4 | 1% |

*wt % in Table 3 is based on the total weight of the foam bead
CS = comparative sample D. Sintering Sintered foam structures are formed from the foam beads. Foamed beads are vacuum sucked into a steam chesting mold. Then, high pressure steam is injected into the mold to heat/melt the foam beads' surface. At the same time, the mold is closed to achieve inter-bead sintering. The steam pressure is dependent on the resin type contained in the foam beads. Sintering is followed by a water cooling process and a vacuum process to remove water from the sintered foam structure. The whole cycle time is 2-5 min. The prepared sintered foam structure is a plaque with the following dimensions: 20 cm (length)×10 cm (width)×1-2 cm (thickness). The sintered foam structure has two skin layers along the 1-2 cm thickness of the structure. Each skin layer is in contact with the mold surface before the sintered foam article is removed from the mold.

The composition and properties of the sintered foam structures are provided below in Table 4.

TABLE 4

Composition and Properties of Sintered Foam Structures*

| Composition | CS 1 Structure<br>CS 1 Foam Bead<br>(100 wt % INFUSE<br>D9130.05) | Ex 2 Structure<br>Ex 2 Foam Bead<br>(70 wt % INFUSE D9130.05/<br>30 wt % Si-g-INFUSE 9100) | Ex 3 Structure<br>Ex 3 Foam Bead<br>(100 wt % Si-g-INFUSE<br>D9130.05) |
|---|---|---|---|
| Foam Density | 0.239 g/cc | 0.175 g/cc | NM |
| Asker C | 30.6 | 32.6 | NM |
| Falling Ball Rebound | 58.4% | 62.2% | NM |
| Average Strain at Break | 39% | 62% | NM |
| Average Stress at Break | 0.47 MPa | 0.54 MPa | NM |
| Type C Tear | 2.97 N/mm | 5.49 N/mm | NM |
| Split Tear | 1.38 N/mm | 1.19 N/mm | NM |
| Linear Shrinkage | 0.4% | 3.3% | NM |
| Compression Set 50% (50° C./6 hours), 24 hr recovery | 69.7% | 52.5% | NM |
| Gel Content | 0% | 17.3% | NM |

*wt % in Table 4 is based on the total weight of the sintered foam structure
CS = comparative sample
NM = not measured It has been discovered that sintered foam structures formed from foam beads containing a composition including (A) silane-grafted ethylene/1-octene copolymer (Si-g-INFUSE 9100) and (B) an ethylene/1-octene multi-block copolymer (INFUSE D9130.05) exhibit (i) much higher Type C tear strength (greater than 3 N/mm); (ii) slightly higher Asker C hardness (greater than 32); (iii) higher falling ball rebound (greater than 62%); (iv) average strain at break (greater than 60%); (v) higher average stress at break (greater than 0.50 MPa), and (vi) much lower compression set (better recovery), with an even lower foam density (less than 0.20 g/cc) than a comparative sintered foam structure formed from foam beads containing a composition including ethylene/1-octene multi-block copolymer (INFUSE D9130.05) (Compare Ex 2 Structure with CS 1 Structure).

Figure 1:
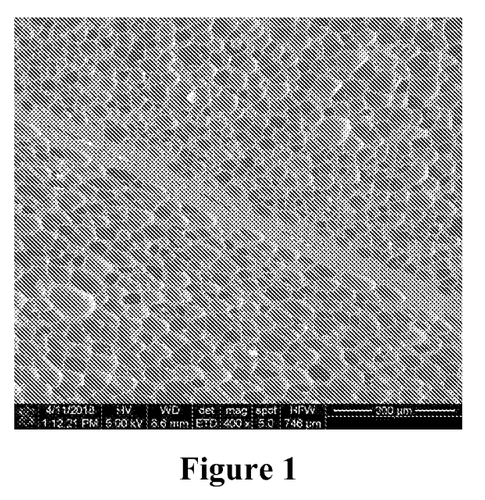
FIG. 1 is a scanning electron microscope (SEM) micrograph of Ex 2 Structure.
Figure 2:
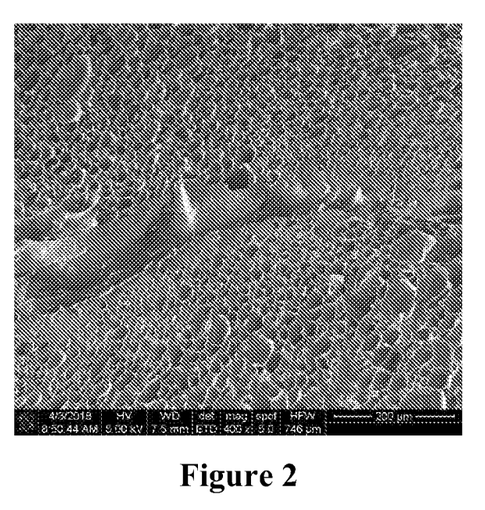
FIG. 2 is a scanning electron microscope (SEM) micrograph of CS 1 Structure.

In the foam industry, it is preferable to have equivalent (or higher) performance at a lower foam density because lightweight structures are desirable. However, foam performance (especially mechanical performance) is known to be related to foam density. Traditionally, lower foam density results in lower mechanical performance of a foam. It has unexpectedly been discovered that sintered foam structures formed from foam beads containing a composition including (A) silane-grafted ethylene/1-octene copolymer (Si-g-INFUSE 9100) and (B) an ethylene/1-octene multi-block copolymer (INFUSE D9130.05) exhibit a lower foam density (less than 0.20 g/cc) and improved mechanical performance and compression set resistance than a comparative sintered foam structure formed from foam beads containing a composition including ethylene/1-octene multi-block copolymer (INFUSE D9130.05) (Compare Ex 2 Structure with CS 1 Structure). Not wishing to be bound by any particular theory, Applicant believes the improved mechanical performance is due to improved sintering performance, and the improved compression set resistance is due to the increased gel level of the sintered foam structure led by the moisture cure of the Si-g-INFUSE 9100. Specifically, the Ex 2 Foam Beads were well fused with each other and had few defects when fused to form Ex 2 Structure, as depicted in FIG. 1, which is an SEM micrograph of Ex 2 Structure. On the other hand, the CS 1 Foam Beads had relatively poor inter-bead fusing, as depicted in FIG. 2, which is an SEM micrograph of CS 1 Structure.

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A foam bead formed from a composition comprising:
 (A) a silane-functionalized ethylene/α-olefin multi-block interpolymer, wherein the foam bead has a gel content from 0.1% to 3%.

2. The foam bead of claim 1, wherein the composition comprises:
 (A) the silane-functionalized ethylene/α-olefin multi-block interpolymer; and
 (B) an ethylene/α-olefin multi-block interpolymer.

3. The foam bead of claim 1, wherein the silane-functionalized ethylene/α-olefin multi-block interpolymer has a density from 0.865 g/cc to 0.900 g/cc.

4. The foam bead of claim 1, wherein the silane-functionalized ethylene/α-olefin multi-block interpolymer has a melt index (I2) from 0.05 g/10 min to 5.0 g/10 min.

5. The foam bead of claim 2 wherein the weight ratio of (B) ethylene/α-olefin multi-block interpolymer and (A) silane-functionalized ethylene/α-olefin multi-block interpolymer is from 0 to 2.50.

6. A sintered foam structure formed from foam beads that are formed from a composition comprising:

(A) a silane-functionalized ethylene/α-olefin multi-block interpolymer, wherein the foam beads have a gel content from 0.1% to 3%.

7. The sintered foam structure of claim 6, wherein the composition comprises:
   (A) the silane-functionalized ethylene/α-olefin multi-block interpolymer; and
   (B) an ethylene/α-olefin multi-block interpolymer.

8. The sintered foam structure of claim 7 wherein the weight ratio of (B) ethylene/α-olefin multi-block interpolymer and (A) silane-functionalized ethylene/α-olefin multi-block interpolymer is from 0 to 2.50.

9. An article comprising at least one component formed from the sintered foam structure of claim 6.

10. The foam bead of claim 1, wherein the silane-functionalized ethylene/α-olefin multi-block interpolymer comprises a base ethylene/α-olefin multi-block copolymer consisting of (i) ethylene and (ii) C4- C8 α-olefin comonomer.

11. The foam bead of claim 10, wherein the foam bead has a gel content from 0.1% to 1%.

12. The foam bead of claim 11, wherein the foam bead has a foam density of less than 0.2 g/cc.

13. The sintered foam structure, wherein the silane-functionalized ethylene/α-olefin multi-block interpolymer comprises a base ethylene/α-olefin multi-block interpolymer consisting of (i) ethylene and (ii) C4 -C8 α-olefin comonomer.

\* \* \* \* \*